United States Patent
Bohme

(10) Patent No.: US 12,005,945 B2
(45) Date of Patent: Jun. 11, 2024

(54) HIGHWAY GRADE CROSSING GATE SYSTEM INCLUDING A GATE MECHANISM TO ROTATE A GATE ARM WITH HUMAN MACHINE INTERFACE AND VOLTAGE REDUCTION CIRCUIT

(71) Applicant: Siemens Mobility, Inc., New York, NY (US)

(72) Inventor: Richard C. Bohme, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 938 days.

(21) Appl. No.: 16/980,292

(22) PCT Filed: Apr. 12, 2018

(86) PCT No.: PCT/US2018/027294
§ 371 (c)(1),
(2) Date: Sep. 11, 2020

(87) PCT Pub. No.: WO2019/199310
PCT Pub. Date: Oct. 17, 2019

(65) Prior Publication Data
US 2021/0001908 A1   Jan. 7, 2021

(51) Int. Cl.
*B61L 29/22* (2006.01)
*B61L 29/04* (2006.01)
(Continued)

(52) U.S. Cl.
CPC ............... *B61L 29/22* (2013.01); *B61L 29/04* (2013.01); *H02K 7/102* (2013.01); *H02K 7/116* (2013.01); *H02K 11/30* (2016.01); *H02K 2211/03* (2013.01)

(58) Field of Classification Search
CPC ......... B61L 29/04; B61L 29/22; H02K 7/102; H02K 7/116; H02K 11/30; H02K 2211/03
See application file for complete search history.

(56) References Cited

U.S. PATENT DOCUMENTS

2005/0284987 A1* 12/2005 Kande ................... B61L 29/16
246/125

FOREIGN PATENT DOCUMENTS

DE         10019957 A1     10/2001
DE         10220965 A1     12/2003
(Continued)

OTHER PUBLICATIONS

Musy M: "Neuer Barrierenantrieb Und Neuer Schlagbaum Bei Den Schweizerischenbundesbahnen (SBB)", Signal + Draht, DVV, vol. 86, No. 3, Mar. 1, 1994 (Mar. 1, 1994), pp. 76-79, XP000482800, / Jan. 3, 1994.

(Continued)

*Primary Examiner* — Robert J McCarry, Jr.

(57) ABSTRACT

A highway grade crossing gate system comprises a gate arm configured to rotate 90 degrees from a horizontal position to a vertical position and vice versa and a highway grade crossing gate mechanism coupled to the gate arm for controlling rotation of the gate arm without mechanical user adjustments but rather use user angle and time inputs/outputs. The highway grade crossing gate mechanism includes a DC motor to drive the gate arm up and down and a voltage reduction circuit to receive an input voltage from a battery and reduce the input voltage. The highway grade crossing gate mechanism further includes a human machine interface (HMI) to receive a plurality of programmable set points as operational variables for operation of the gate arm without manually adjustable cams on a main shaft that move contacts to open or close at some preset angular rotation. The highway grade crossing gate mechanism further includes a (Continued)

control printed circuit board (PCB) coupled to the HMI, the voltage reduction circuit, the brake, and the DC motor. The control PCB to receive an output based on an angular position of the gate arm as a position indication to have the control PCB provide an output for the operation of the gate arm.

18 Claims, 4 Drawing Sheets

(51) Int. Cl.
*H02K 7/102* (2006.01)
*H02K 7/116* (2006.01)
*H02K 11/30* (2016.01)

(56) References Cited

FOREIGN PATENT DOCUMENTS

WO         2014155048 A1    10/2014
WO    WO-2014155048 A1 * 10/2014  ............... A01K 1/00

OTHER PUBLICATIONS

PCT International Search Report and Written Opinion of International Searching Authority mailed Jan. 21, 2019 corresponding to PCT International Application No. PCT/US208/027294 filed Apr. 12, 2018.

* cited by examiner

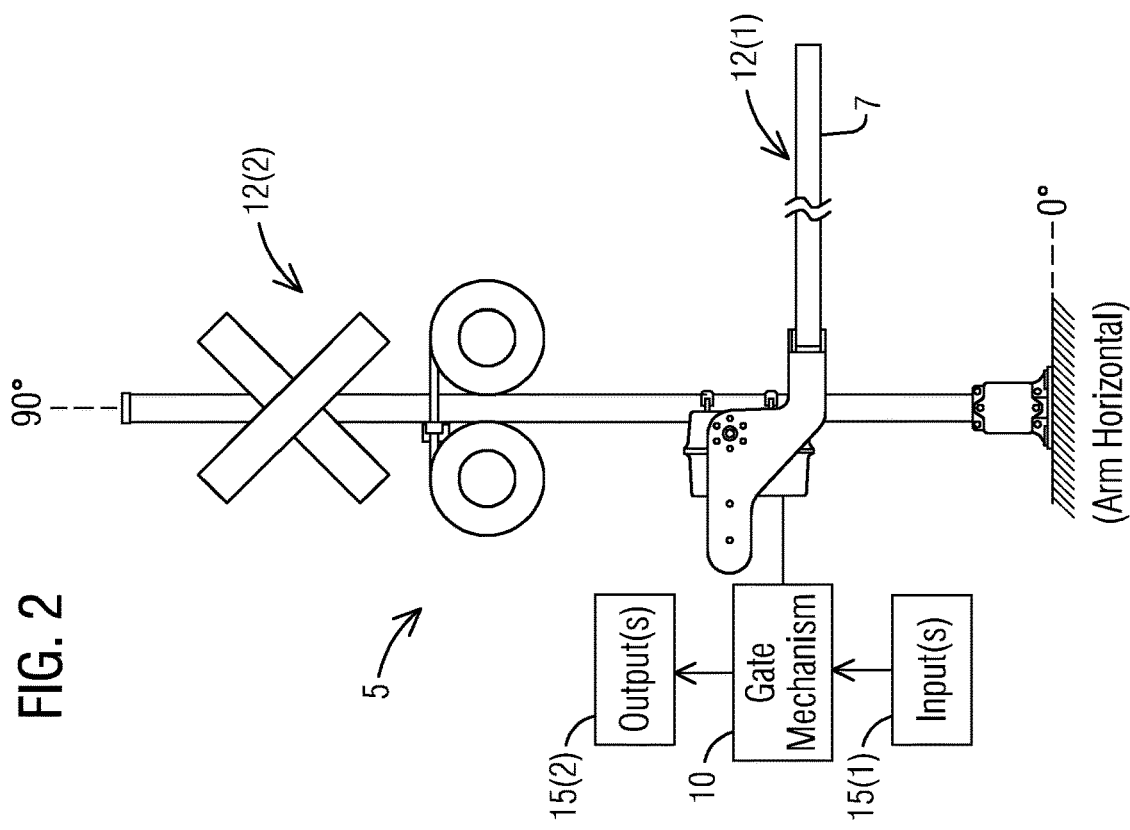
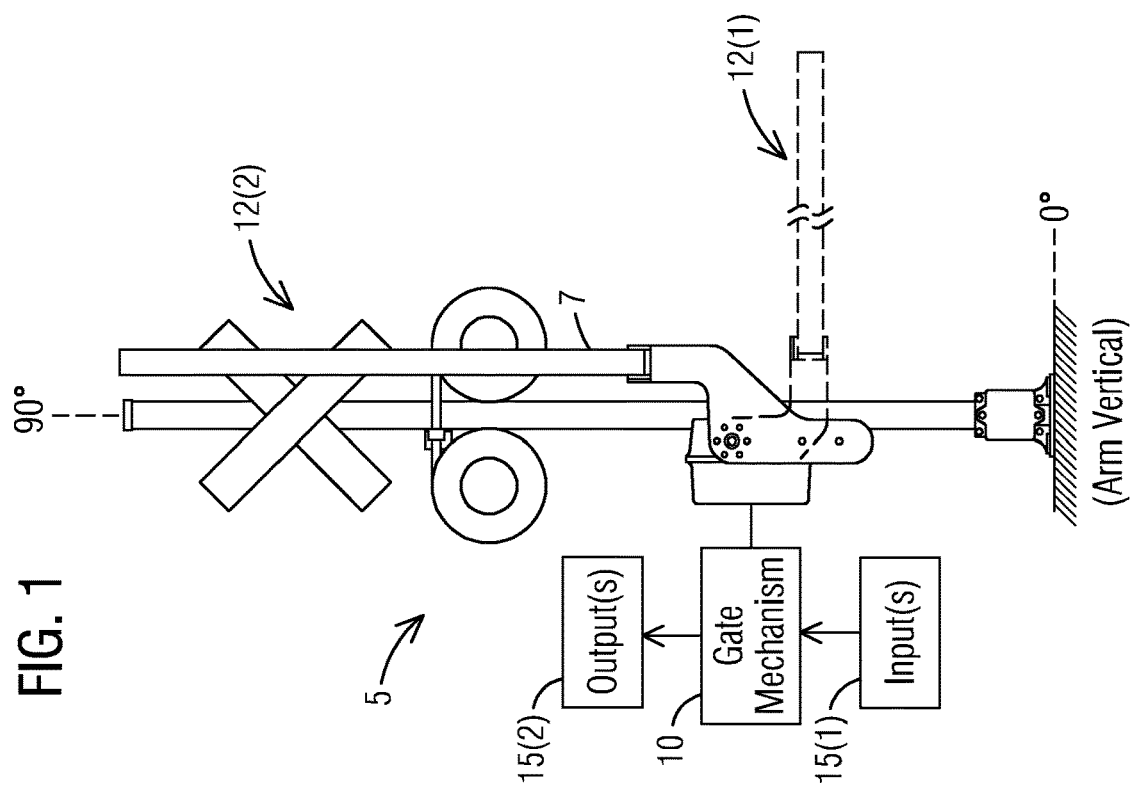

HIGHWAY GRADE CROSSING GATE SYSTEM INCLUDING A GATE MECHANISM TO ROTATE A GATE ARM WITH HUMAN MACHINE INTERFACE AND VOLTAGE REDUCTION CIRCUIT

BACKGROUND

1. Field

Aspects of the present invention generally relate to a highway grade crossing system including a gate mechanism to rotate a gate arm with a voltage reduction circuit and a human machine interface that receives a plurality of programmable set points as operational variables for operation of the gate arm without manually adjustable cams on a main shaft that move contacts to open or close at some preset angular rotation.

2. Description of the Related Art

An automatic gate serves as a barrier across a highway when a train is approaching or occupying a crossing. The gate is reflectorized with 16-inch diagonal or vertical red and white stripes. To enhance visibility during darkness, three red lights are placed on the gate arm. The light nearest to the tip burns steadily; the other two flash alternately. The gate is combined with a standard flashing light signal that provides additional warning before the arm starts to descend, while the gate arm is across the highway, and until the gate arm ascends to clearance. The gate mechanism is either supported on the same post with the flashing light signal or separately mounted on a pedestal adjacent to the flashing light signal post. In a normal sequence of operation, the flashing light signals and the lights on the gate arm in its normal upright position are activated immediately upon the detection or approach of a train. Industry standards require that the gate arm shall start its downward motion not less than 3 seconds after the signal lights start to operate; shall reach its horizontal position before the arrival of the train; and shall remain in that position as long as the train occupies the crossing. When the train clears the crossing, and no other train is approaching, the gate arm shall ascend to its upright position normally in not more than 12 seconds, following which the flashing lights and the lights on the gate arm shall cease operation.

At many roadway railroad crossings, pedestrian paths and sidewalks also cross the railroad track. Crossing gates, which typically are raised by default and lowered when a train approaches and crosses an intersection of a road and railroad track (i.e., a crossing), may be provided for roadway and pedestrian safety.

Currently, all highway grade crossing gate mechanisms in the USA use cam and contacts to control various features in a crossing gate. Additionally, they use relays to switch circuits that drive a DC motor or DC compound PL/field coil motor that raises and lowers a gate arm. These are typically 12 VDC systems but are required to operate beyond the American Railway Engineering and Maintenance-of-Way Association (AREMA) recommended voltage of 11 to 16 VDC. The higher voltages make a motor run faster so brushes don't last as long, electronic components are driven with higher voltages and the cam/contact configuration makes for a quick start/stop operation that puts additional stress on mechanical components, the gate arm itself and conversion bracket/gate savers.

Currently there is no solution for the customer over voltage situations except turning a control printed circuit board (PCB) OFF at set over and under voltage situations.

Therefore, there is a need for a highway grade crossing gate mechanism of a gate arm to step down any DC voltage above a range to one level VDC thus allowing a common gate mechanism to be used in two different level VDC applications and operate the gate arm without manually adjustable cams on a main shaft that move contacts to open or close at some preset angular rotation.

SUMMARY

Briefly described, aspects of the present invention relate to control circuitry that would step down any DC voltage above 12 VDC-30 VDC to 12 VDC. This allows a common gate mechanism to be used in 12 and 24 VDC applications. The low voltage limit would be set to 9 VDC. This means that the 12 VDC electronics would see only 9 to 12 VDC and not be subject to higher voltages. The motor speed would now be consistent with 12 to 30 VDC incoming voltage and would only slow down as the voltage was reduced 12 to 9 VDC. Having the voltage reduced to 12 VDC on a control PCB, arcing/sparking of the relay contacts is reduced (if relays are used). This also will make a pair of gates operate consistently as the voltage is limited in the gate; variables as cable length and line loss are greatly reduced. If a DC motor is used, the brush and commutator life is greatly increased as we are driving the motor at its rated voltage. Cams and contacts can be replaced with programmable set points for power down, power up and brake application, lights, bell, gate down position and various other operations. A brushless 12 VDC motor can be used in conjunction with Hall effect sensors or an encoder. With such measuring devices and a known gear train reduction ratio, we know how many revolutions a motor must make to raise the gate arm to the vertical position. We also then have the ability to drive an output at any gate arm angle thus eliminating the need for cams and contacts. With a user adjustable input for gate up and gate down time, a controller can then PWM (pulse width modulate) the motor to now control up and down times of the gate. (speed=time/distance or in a rotational gear example speed=time/motor revolutions). This now gives us up and down control times independent of a supply voltage, a gate torque and eliminates some variables in gate set up. Since we know how many revolutions the motor must make, we can soft start the gate from vertical to reduce the initial stress on the mechanicals, drive down with the assist of gravity to a preset angle, turn OFF the motor and dynamically brake or apply reverse current braking to slowly control the descent of the gate arm and also have a soft stop adjustable input angle as the gate arm nears the horizontal position. An optional horizontal brake can then be energized to lock the gate arm down. As for the gate arm going up, the horizontal brake feature is released, PWM soft start used to get the gate arm moving from the horizontal position. PWM is then used with the variable time input to control the gate arm/motor speed as it approaches the vertical position. Another PWM sequence is used to slow the movement of the motor/gate arm as it reaches the vertical position and energizes the brake. This slow start and stop will eliminate a lot of the stresses put on the components and the gate arm will appear to have smooth and fluid movement without the jerking and the gate arm whip we currently have.

In accordance with one illustrative embodiment of the present invention, a highway grade crossing gate mechanism is provided. It comprises a gate arm configured to rotate 90 degrees from a horizontal position to a vertical position and vice versa. It further comprises a gear train coupled to a main shaft, a DC motor coupled to the gear train, and a brake coupled to the DC motor and a voltage reduction circuit to receive an input voltage from a battery and reduce the input voltage. The highway grade crossing gate mechanism further comprises a human machine interface (HMI) to receive a plurality of programmable set points as operational variables for at least one of a power down indication, a power up indication, a brake application, a flashing lights turn on or turn off angle, a bell turn off or turn on angle, and angle information for a gate down position. The highway grade crossing gate mechanism further comprises a control printed circuit board (PCB) coupled to the HMI, the voltage reduction circuit, the brake, and the DC motor. The control PCB to receive an output based on an angular position of the gate arm as a position indication to have the control PCB provide an output to the flashing lights, the bell and provide a plurality of angle outputs. The control PCB is controlled by a gate controller coupled to the control PCB such that the highway grade crossing gate mechanism is operable without manually adjustable cams on the main shaft that move contacts to open or close at some preset angular rotation.

In accordance with another illustrative embodiment of the present invention, a highway grade crossing gate system is provided. The system comprises a gate arm configured to rotate 90 degrees from a horizontal position to a vertical position and vice versa. The system further comprises a highway grade crossing gate mechanism coupled to the gate arm. The highway grade crossing gate mechanism includes a DC motor to drive the gate arm up and down and a voltage reduction circuit to receive an input voltage from a battery and reduce the input voltage. The highway grade crossing gate mechanism further includes a human machine interface (HMI) to receive a plurality of programmable set points as operational variables for operation of the gate arm without manually adjustable cams on a main shaft that move contacts to open or close at some preset angular rotation. The highway grade crossing gate mechanism further includes a control printed circuit board (PCB) coupled to the HMI, the voltage reduction circuit, the brake, and the DC motor. The control PCB to receive an output based on an angular position of the gate arm as a position indication to have the control PCB provide an output for the operation of the gate arm.

BRIEF DESCRIPTION OF THE DRAWINGS

FIG. 1 illustrates a schematic representation of a highway grade crossing gate system with a railroad crossing gate arm in a vertical position in accordance with an exemplary embodiment of the present invention.

FIG. 2 illustrates a schematic representation of the highway grade crossing gate system with the railroad crossing gate arm in a horizontal position in accordance with an exemplary embodiment of the present invention.

DETAILED DESCRIPTION

Figure 3:
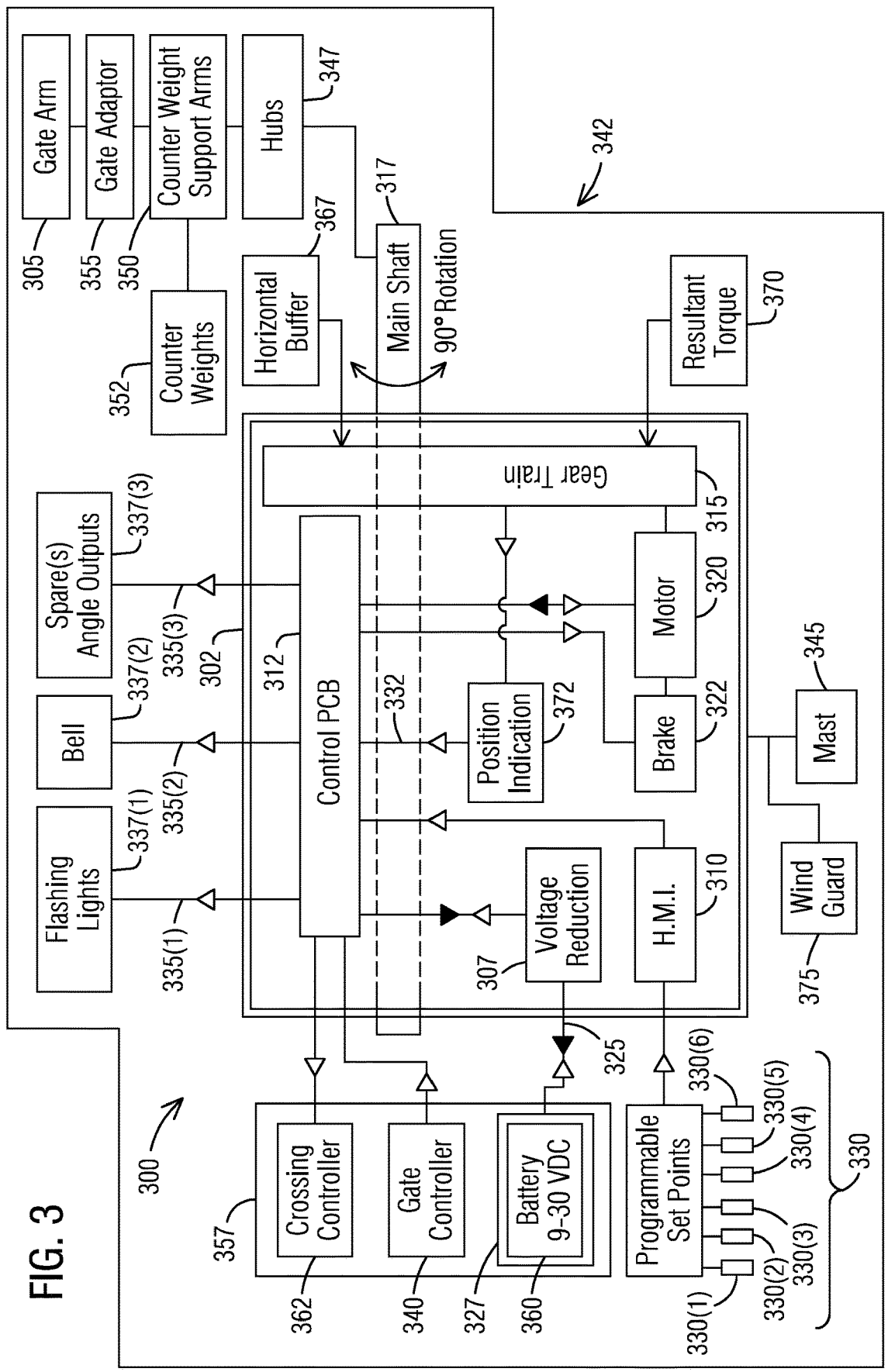
FIG. 3 illustrates a schematic representation of a highway grade crossing gate system including a highway grade crossing gate mechanism to control rotation of a railroad crossing gate arm using a voltage reduction circuit, a human machine interface (HMI), and a control printed circuit board (PCB) in accordance with an exemplary embodiment of the present invention.

To facilitate an understanding of embodiments, principles, and features of the present invention, they are explained hereinafter with reference to implementation in illustrative embodiments. In particular, they are described in the context of controlling rotation of a railroad crossing gate arm with a highway grade crossing gate mechanism using a voltage reduction circuit, a human machine interface (HMI), and a control printed circuit board (PCB). Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Consistent with one embodiment of the present invention, FIG. 1 represents a representation of a highway grade crossing gate system 5 for controlling rotation of a railroad crossing gate arm 7 in accordance with an exemplary embodiment of the present invention. The highway grade crossing gate system 5 comprises a highway grade crossing gate mechanism 10 coupled to the railroad crossing gate arm 7 to control rotation of it 90 degrees from a horizontal position 12(1) to a vertical position 12(2) and vice versa. The highway grade crossing gate mechanism 10 includes an electric motor such as a DC motor (not shown) to drive the railroad crossing gate arm 7 up and down. The highway grade crossing gate mechanism 10 further includes a voltage reduction circuit (not shown) to receive an input voltage from a battery and reduce the input voltage. The input voltage is part of input(s) 15(1) to the highway grade crossing gate mechanism 10.

The highway grade crossing gate mechanism 10 further includes a human machine interface (HMI) (not shown) to receive a plurality of programmable set points as operational variables for operation of the gate arm without manually adjustable cams on a main shaft that move contacts to open or close at some preset angular rotation. The plurality of programmable set points is part of the input(s) 15(1). The highway grade crossing gate mechanism 10 further includes a control printed circuit board (PCB) (not shown) coupled to the HMI, the voltage reduction circuit, a brake, and the DC motor. The control PCB is configured to receive an output based on an angular position of the railroad crossing gate arm 7 as a position indication to have the control PCB provide an output for the operation of the railroad crossing gate arm 7. The output of the control PCB provides for the operation of the railroad crossing gate arm 7 is part of output(s) 15(2).

Referring to FIG. 2, it illustrates a schematic representation of the highway grade crossing gate system 5 with the railroad crossing gate arm 7 in the horizontal position 12(1)

in accordance with an exemplary embodiment of the present invention. The highway grade crossing gate mechanism 10 provides an internal control with variable inputs 15(1) and outputs 15(2) in place of manually adjustable cams on a main shaft that move contacts (open or close) at some preset angular rotation of the railroad crossing gate arm 7 (as viewed from the gate arm the public would see). Depending on a position of the main shaft, the angular rotation of the cam on the shaft and the intent of the cam (open or close a contact) the screws holding the cam halves to the main shaft can be very difficult to access for angular adjustments. A HMI interface (a menu screen with a touch pad) may be used in place of adjustable cams and contacts to set operational variables such as, at what angle a bell should turn ON and OFF and what angle to turn ON and OFF flashing lights. Additional angle information can be used for optional gate down position (horizontal or 0 degrees). This HMI interface can be as simple at an application on a smart phone that connects to the control PCB thus saving the expense of a touch pad in the highway grade crossing gate mechanism 10.

The highway grade crossing gate mechanism 10 also has a "voltage reduction" circuit to reduce incoming battery voltage (up to 30 VDC for 24 VDC crossings) to 12 VDC. Typical 12 VDC crossings typically supply 9 to 18 VDC to the equipment. By limiting the voltage once inside of the gate mechanism housing, operational variables due to a range of voltage are eliminated. The speed change of the motor due to line loss/voltage drop would have little to no effect. Additionally the highway grade crossing gate mechanism 10 would use a new motor control methodology. Instead of just switching voltage to the motor ON and OFF (up or down) and mechanically shocking the system with the quick starts and stops, the new motor control methodology would have variable/user adjustable soft start and soft stop (dynamic braking) to smoothly start and stop the movement of the railroad crossing gate arm 7. New operational features would include user adjustable up and down times.

Currently, a gate mechanism can be adjusted so the downward movement is in the 10 to 15 second range and is dependent on the resultant torque on the main shaft of the gate mechanism. Additionally, the current control does not allow adjustability of time in the upward movement. The upward movement is solely based on voltage (variable) and load (resultant torque on the main shaft).

A motor control circuit knows how many revolutions must be made to move the railroad crossing gate arm 7 90 degrees (horizontal to vertical for example). With a user adjustable time setting, the motor may be controlled by pulse width modulation (PWM) to control a motor speed in the up direction along with soft starts and soft stops of the initial and final movement of the railroad crossing gate arm 7. The limit of time adjustability in the up direction (fastest speed) is the regulated/controlled 12 VDC being directed to the motor. A user adjustable time setting may be controlled by PWM in the down direction over a calculated angle (no set cam/contact) and then switch to dynamic braking to resist and slow the railroad crossing gate arm 7 as it approaches the horizontal position. An entrance gate is counter weighted to be gate side heavy so in the event of loss of power, the gate arm goes to the horizontal position 12(1) via gravity (gate side heavy. If the railroad crossing gate arm 7 is determined to be coming down too fast, a reverse current braking may also be used to slow the movement of the main shaft/gate arm and an over-speed circuit (hard snub) may be used.

The highway grade crossing gate mechanism 10 provides a form of highway crossing gate control operation in that mechanical user adjustments (cams and contact) have been replaced with user angle and time inputs/outputs for an existing bell, flashing lights and gate down indication. Since these mechanical components are no longer used for each current function, there is not a space limitation for adding additional cams and contacts for different functions. As user adjustable angle inputs 15(1)/outputs 15(2), additional reporting and features may be added for expandability. The highway grade crossing gate mechanism 10 to limit incoming battery voltage to 12 VDC. This eliminates the need for 24 VDC and 12 VDC voltage options and makes this a "1 gate fits all" solution. (different countries use different battery voltages on their railroads, e.g., USA/Canada are 12 VDC while the UK and Australia are 24 VDC systems). This limiting of the incoming voltage provides many benefits to a consumer and to a manufacturer. For example, 12 VDC components are specified to work on a specific tolerance. Many times the supplied voltage is outside that tolerance or changes the performance and/or life expectancy of various components. Currently, we have situations that a customer is supplying 16.5 VDC to operate a 12 VDC gear motor. This is 37.5% over nominal which decreases motor brush life due to an increased voltage. This same holds true for many of the electronic components used.

The highway grade crossing gate mechanism 10 provides a feature as a way to control the motor to drive the railroad crossing gate arm 7 up or down. By using user adjustable inputs 15(1), a soft start and a soft stop operation is added to a motor control logic and further adjustable features may be created to control the up and down times of the railroad crossing gate arm 7. Since we are only moving the railroad crossing gate arm 7 roughly 90 degrees via a series of gears (a gear train), we then know how many motor revolutions are required to make any angle change in the railroad crossing gate arm 7. Once time is now factored in as a user input over the number of motor revolutions to make, we can drive the output(s) 15(2) for any angle and may use PWM (pulse width modulation) to control the motor to change the speed/time the motor takes to make a specific number of revolutions. This works in both the up and down direction but in the down direction, we have the effect of gravity helping to bring the railroad crossing gate arm 7 down (gate side heavy). Currently, we drive the railroad crossing gate arm 7 down from 90 degrees to 45 or 70 degrees and dynamically brake (snub the motor with adjustable resistors) to slow the railroad crossing gate arm 7 movement as it approaches horizontal. A motor control circuitry of the highway grade crossing gate mechanism 10 may dynamically brake to slow the railroad crossing gate arm 7 down or even use a reverse current braking to slow the movement. A voltage limiting feature, a keypad or a cell phone application to change input(s) 15(1) during an initial setup, means of counting motor revolutions and or detecting main shaft angle PWM and reverse current braking features may be used. Optional features could be additional inputs or the output(s) 15(2) based on a gate arm angle.

Apart from limiting the voltage and user providing adjustable inputs (removing the cams and contacts), the function of the highway grade crossing gate mechanism 10 causes the railroad crossing gate arm 7 to go up and come down and the bell and flashing lights operate at a specific angle via cams and contacts. The function or operation of the highway grade crossing gate mechanism 10 is different in that the public would see smoother movement of the railroad crossing gate arm 7 with the soft start/soft stop motor control. This would lessen the flex in the railroad crossing gate arm 7 and mechanical components from abruptly starting and stopping the motor. The customer would see more consistent operation with less maintenance/replacement parts as voltage is limited and longer mechanical service life.

Turning now to FIG. 3, it illustrates a schematic representation of a highway grade crossing gate system 300 including a highway grade crossing gate mechanism 302 to control rotation of a railroad crossing gate arm 305 using a voltage reduction circuit 307, a human machine interface (HMI) 310, and a control printed circuit board (PCB) 312 in accordance with an exemplary embodiment of the present invention. The highway grade crossing gate mechanism 302 comprises the railroad crossing gate arm 305 configured to rotate 90 degrees from a horizontal position to a vertical position and vice versa.

The highway grade crossing gate mechanism 302 further comprises a gear train 315 coupled to a main shaft 317. The highway grade crossing gate mechanism 302 further comprises a DC motor 320 coupled to the gear train 315. The DC motor 320 in conjunction with Hall effect sensors or an encoder provides measuring devices. With the measuring devices and a known gear train reduction ratio of the gear train 315 a number of revolutions the DC motor 320 make to raise the railroad crossing gate arm 305 to the vertical position are determined which provides an ability to drive an output of the highway grade crossing gate mechanism 302 at any gate arm angle thus eliminating a need for the cams and the contacts.

The highway grade crossing gate mechanism 302 further comprises an electric brake 322 coupled to the DC motor 320. The highway grade crossing gate mechanism 302 further comprises the voltage reduction circuit 307 to receive an input voltage 325 from a battery 327 and reduce the input voltage 325. For example, the voltage reduction circuit to receive the input voltage 325 of 9V-30V DC from the battery 327 and reduce the input voltage 325 to 12V.

The highway grade crossing gate mechanism 302 further comprises the human machine interface (HMI) 310 to receive a plurality of programmable set points 330 as operational variables for a power down indication 330(1), a power up indication 330(2), a brake application 330(3), a flashing lights turn on or turn off angle 330(4), a bell turn off or turn on angle 330(5), and/or angle information 330(6) for a gate down position. The highway grade crossing gate mechanism 302 further comprises the control printed circuit board (PCB) 312 coupled to the HMI 310, the voltage reduction circuit 307, the brake 322, and the DC motor 320. The control PCB 312 is configured to receive an output 332 based on an angular position of the railroad crossing gate arm 305 as a position indication to have the control PCB 312 provide an output 335(1) to flashing lights 337(1), an output 335(2) to a bell 337(2) and provide an output 335(3) to a plurality of angle outputs 337(3).

The control PCB 312 is controlled by a gate controller 340 coupled to the control PCB 312 such that the highway grade crossing gate mechanism 302 is operable without manually adjustable cams on the main shaft 317 that move contacts to open or close at some preset angular rotation. With a user adjustable input for a gate up time and a gate down time, the gate controller 340 pulse width modulates (PWM) the DC motor 320 to control up and down times of the railroad crossing gate arm 305 as (speed=time/distance) or in a rotational gear case (speed=time/motor revolutions). The gate up and down times of the railroad crossing gate arm 305 are independent of a supply voltage and a gate torque.

Based on a known number of revolutions the DC motor 320 ought to make, a soft start of the railroad crossing gate arm 305 from the vertical position is implemented. Then the railroad crossing gate arm 305 is driven down with an assist of gravity to a preset angle, turning OFF the DC motor 320 and dynamically braking or applying a reverse current braking to slowly control decent of the railroad crossing gate arm 305 and using a soft stop adjustable input angle to soft stop the railroad crossing gate arm 305 as the railroad crossing gate arm 305 nears the horizontal position. As the railroad crossing gate arm 305 is going up, a horizontal brake feature is released, a pulse width modulation (PWM)-based soft start is used to get the railroad crossing gate arm 305 moving from the horizontal position. Pulse width modulation (PWM) is then used with a variable time input to control the railroad crossing gate arm 305 or a motor speed as the railroad crossing gate arm 305 approaches the vertical position. A PWM sequence is used to slow the movement of the DC motor 320 or the railroad crossing gate arm 305 as the railroad crossing gate arm 305 reaches the vertical position and energizes the brake 322.

The highway grade crossing gate mechanism 302 is an electro-mechanical portion of a highway grade crossing 342. The highway grade crossing gate mechanism 302 is mounted on a vertical mast 345 at a predetermined distance above a road way. Secured to each side of the main shaft 317 of the highway grade crossing gate mechanism 302, are hubs 347. Counter weight support arms 350 are bolted to the hubs 347. At the field side of the counter weight support arms 350 are counter weights 352. On the road side of the counter weight support arms 350 is a conversion bracket and a gate adaptor, 355. The conversion bracket spans with width of the 2 support arms and in the middle of this is the mechanical connection for the railroad crossing gate arm 305.

In a crossing house or an enclosure 357 are various electrical railroad components and connections. The main items in the house 357 that connect directly to the railroad crossing gate arm 305, is a battery bank 360, the gate controller 340 and a crossing controller 362. The batteries of the battery bank 360 are recharged by an AC charger (not shown). The batteries of the battery bank 360 are sized to operate the highway grade crossing 342 in the event of an AC power failure for a predetermined period of time. There are typically 12 VDC and 24 VDC battery systems used and each of these has a plus or minus tolerance. For the sake of this discussion, the batteries of the battery bank 360 have a voltage range of 9-30 VDC.

Signals 335(1-3) leaving the highway grade crossing gate mechanism 302 are based on an angular position of the main shaft 317 but visually seen by the position of the railroad crossing gate arm 305 as it rotates 90 degrees from a horizontal position to a vertical position. These in prior art have been adjustable cams and contacts that are set to open or close and that are mounted internal to the highway grade crossing gate mechanism 302 on the main shaft 317 based on a particular angle setting.

In operation, a supply voltage from the batteries of the battery bank 360 would go to the voltage reduction circuit 307 that would allow only 12 VDC or lower to pass through it. This ensures a consistent voltage that will power the electronics and the DC motor 320. This voltage limitation prevents over voltage conditions and will increase the life of the electronic and mechanical components. The limited battery power from the voltage reduction circuit 307 is fed to the control PCB 312. The control PCB 312 is the "smarts" of the highway grade crossing gate mechanism 302. The control PCB 312 will change a state if there is a change of a state in the gate controller 340. Typically, when the railroad crossing gate arm 305 is commanded to go up by the gate controller 340, a voltage is then supplied to the control PCB

312. This is not to be confused with a main battery voltage from the batteries of the battery bank 360 applied to the voltage reduction circuit 307 and then to the control PCB 312. If a voltage is present from the gate controller 340, the railroad crossing gate arm 305 goes up. If a voltage is removed from the gate controller 340, the railroad crossing gate arm 305 goes down to the horizontal position.

When the railroad crossing gate arm 305 is at the horizontal position across the road way, the control PCB 312 is not applying a power to the DC motor 320 and currently not applying a power to the electric brake 322. The railroad crossing gate arm 305 is mechanically at rest against an adjustable horizontal buffer 367 via the connection between the main shaft 317 that is connected to the last gear in the gear train 315. This adjustable horizontal buffer 367 to raise or lower the railroad crossing gate arm 305 due to field conditions. An entrance gate is set up so that the complete gate mechanism (the components of the highway grade crossing 342 minus the components of the crossing house or an enclosure 357) is counter balanced to be gate side heavy, providing a resultant torque horizontal 370. This is done so if there is a power failure of some sort, the electric brake 322 would release, the DC motor 320, the gear train 315 would free wheel due to the resultant torque horizontal 370 of the railroad crossing gate arm 305 (and all of the items between it and the main shaft 317, to rotate to the horizontal position due to gravity). This is a "fail safe" feature of the highway grade crossing gate mechanism 302.

With a change of a state in the gate controller 340, a voltage signal is sent to the control PCB 312 and a voltage is applied to the DC motor 320 to turn the gear train 315 to raise the railroad crossing gate arm 305. During this process the control PCB 312 is monitoring a position indication 372 (end result is the railroad crossing gate arm 305 angle position of 0 degrees (horizontal) to 90 degrees (vertical)). During the initial set up and installation of the highway grade crossing 342, a railroad employee may input the specific operational parameters 330 via the Human Machine Interface (HMI) 310. These operational parameters 330 are sent and stored as set points on the control PCB 312. Once the position indication 372 has registered that a pre-set operational angle position of the railroad crossing gate arm 305 has been met, the control PCB 312, stops applying the voltage to the DC motor 320 and applies a voltage to the electric brake 322. At this point it is the electric brake 322 that is holding the DC motor 320 that is connected to the gear train 315 etc., holding the railroad crossing gate arm 305 in the up position. This up or "vertical position" may be any angle, not exceeding 90 degrees, that the railroad employee has set through the HMI 310 during a setup configuration.

During an upward movement cycle, the control PCB 312 monitors the position indication 372 looking for other operational parameters. These are typically the gate arm angle output 335(3) to turn OFF the flashing lights 337(1) and/or stop the bell 337(2). This used to be a cam/contact operation that would open or close to do something at a predetermined angle. In this example of the control PCB 312, it is just the output(s) 335(3) based on a predetermined gate arm angle setting.

During a downward movement cycle, once the gate controller 340 changes a state by removing a voltage, the control PCB 312 starts a gate going down cycle. The control PCB 312 removes power to the electric brake 322 and applies a voltage to the DC motor 320 to turn the gear train 315 etc. to start moving the railroad crossing gate arm 305 to a predetermined horizontal position. As previously mentioned, the complete gate mechanism is counter weighted to have the resultant torque horizontal 370 making it gate side heavy. In the downward direction, we have this resultant torque horizontal 370 working in the same direction as gravity. Stated differently, the DC motor 320 is not lifting a load but moving in the same direction as the load (resultant torque horizontal 370). The highway grade crossing gate mechanism 302 controls the time in which the railroad crossing gate arm 305 moves from the vertical position to the horizontal position. This is typically in the 10 to 15 second range but in the U.K. they would like to see a quicker time of 7-8 seconds.

As the railroad crossing gate arm 305 is moving downward, the control PCB 312 references the position (angle) indication 372 and stops the voltage going to the DC motor 320. On the highway grade crossing gate mechanism 302 this is an angle of 70 or 45 degrees depending on a configuration. The highway grade crossing gate mechanism 302 is powering the DC motor 320 for a predetermined angular input via the HMI 310 to cut the power to the DC motor 320 to move the railroad crossing gate arm 305 out and away from a high wind guard 375 that is mounted higher up on the vertical mast 345. This movement control is done with a user adjustable parameter that is now just an output based on an angular position of the position indication 372 to have the control PCB 312 do something different.

Once a predetermined angle condition is met, the DC motor 320 and everything else moves by momentum under the effects of gravity until the last gear in the gear train 315 comes against the adjustable horizontal buffer 367 which essentially is seen as the railroad crossing gate arm 305 being in the horizontal position. Now we need a means of control to resist/slow the momentum/gravity/the resultant torque horizontal 370 to reach the horizontal position in a controlled and smooth movement over an adjustable period of time. This may be done by dynamically braking (snubbing) a motor through a choice of resistors to slow and control the gravity fall movement of the highway grade crossing gate mechanism 302. The highway grade crossing gate mechanism 302 may otherwise use Pulse Width Modulation (PWM) to reduce the speed of the DC motor 320 during an initial powered movement and then apply a reverse current braking to slow the moving resultant torque horizontal 370/the railroad crossing gate arm 305 until it reaches the horizontal position.

With the addition of a timer or a clock on the control PCB 312 that gets started once the gate controller 340 initiates a sequence and with a preset down request time entered via the HMI 310 and a known total gear train reduction ratio, the highway grade crossing gate mechanism 302 may then equate a number of motor revolutions per unit of time to make this full downward movement of the railroad crossing gate arm 305.

A soft motor start could also be used via PWM to slowly start the DC motor 320 in the downward direction. The net effect of this would be seen as a gentle start of the gate arm movement without a sudden mechanical shock load to a drive train or the gear train 315. A soft stop can also be used in the last few degrees of the gate arm movement to allow the gear train 315 to gently settle up and rest against the adjustable horizontal buffer 367. This would result in the railroad crossing gate arm 305 not flexing or bowing during the starting and stopping of the complete movement.

Throughout this downward movement, the position indication 372 may have the control PCB 312 change a state of any output(s) 335(1-3) to turn OFF the bell 337(2) at any angle and give a final indication that the main shaft 317 or the railroad crossing gate arm 305 has reached the horizontal position to give a gate down indication.

PWM modulation may be used to drive the railroad crossing gate arm 305 up. There currently is no speed control of existing gate mechanisms. It moves through the upward movement with a sudden start and a sudden stop of a motor. However, again using PWM, the highway grade crossing gate mechanism 302 can use a soft start and a soft stop to reduce mechanical shock and flexing of the railroad crossing gate arm 305. Time of the movement may now be introduced in the upward direction if desired. The fastest upward time is based on the speed of the DC motor 320 with the resultant load or the resultant torque horizontal 370. An additional feature may also be optional via the HMI 310, that is, to energize the electric brake 322 in the horizontal position.

The control PCB 312 may have a "learn" function during the initial setup of the highway grade crossing 342. This would have the control PCB 312 check, adjust and save some of the data needed to meet the time and angle input settings presented to the HMI 310 during the setup. Once the "learn setup", is complete, the control PCB 312 may be configured to report outputs or deviations of the operation. For example, a gate came down too fast or took too long to complete a movement could be the result of a broken gate arm or ice on the railroad crossing gate arm 305 that changes the resultant torque horizontal 370.

Figure 4:
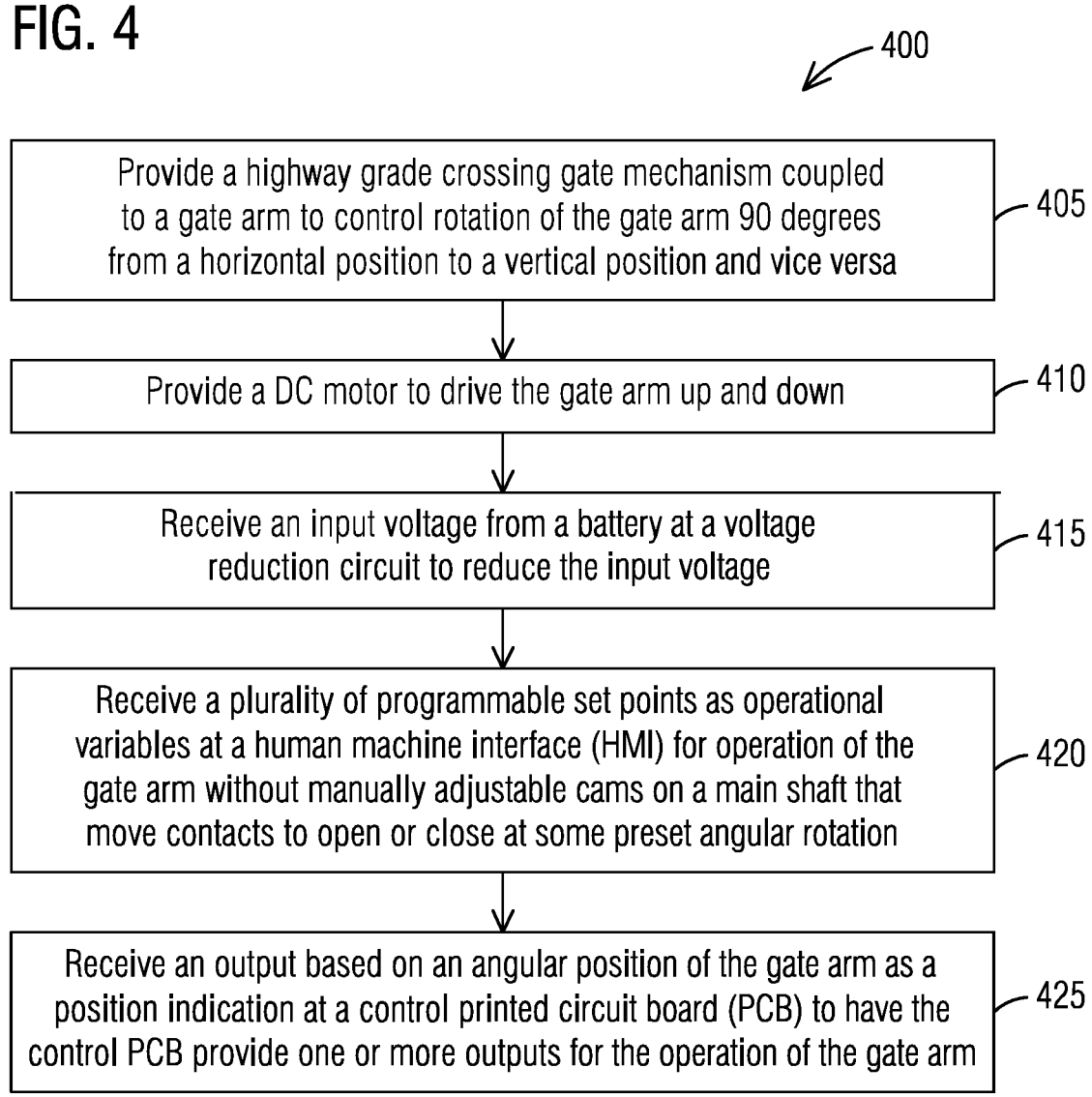
FIG. 4 illustrates a flow chart of a method of controlling rotation of a railroad crossing gate arm with a highway grade crossing gate mechanism using a voltage reduction circuit, a human machine interface (HMI), and a control printed circuit board (PCB) according to one exemplary embodiment of the present invention.

FIG. 4 illustrates a flow chart of a method 400 of controlling rotation of a railroad crossing gate arm with a highway grade crossing gate mechanism using a voltage reduction circuit, a human machine interface (HMI), and a control printed circuit board (PCB) according to one exemplary embodiment of the present invention. Reference is made to the elements and features described in FIGS. 1-3. It should be appreciated that some steps are not required to be performed in any particular order, and that some steps are optional.

The method 400 includes a step 405 of providing the highway grade crossing gate mechanism coupled to the gate arm to control rotation of the gate arm 90 degrees from a horizontal position to a vertical position and vice versa. In step 410, a DC motor is provided to drive the gate arm up and down. At the step 415, an input voltage is received from a battery at the voltage reduction circuit to reduce the input voltage. In step 420, a human machine interface (HMI) to receive a plurality of programmable set points as operational variables for operation of the gate arm without manually adjustable cams on a main shaft that move contacts to open or close at some preset angular rotation. In step 425, a control printed circuit board (PCB) to receive an output based on an angular position of the gate arm as a position indication to have the control PCB provide an output for the operation of the gate arm.

Figure 5:
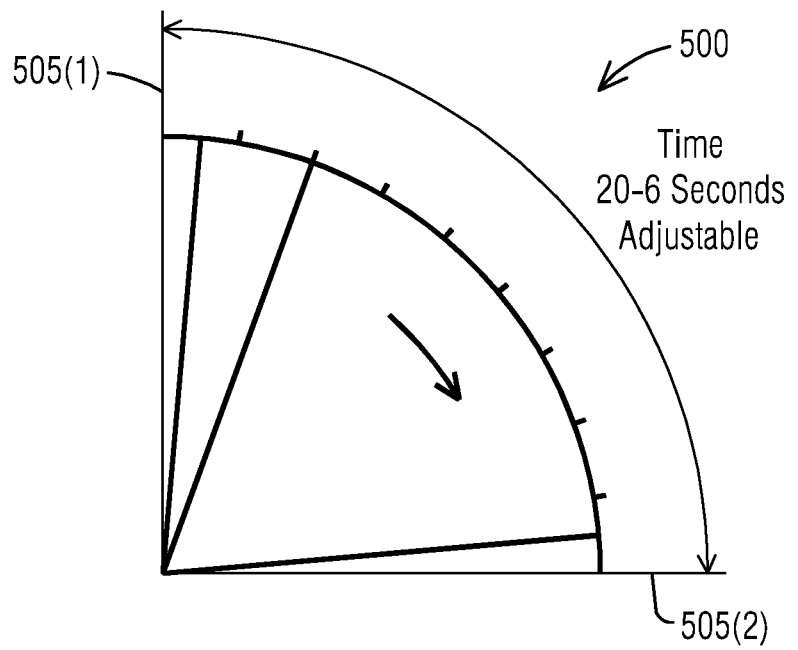
FIG. 5 illustrates a schematic representation of operation of a highway grade crossing entrance gate from a vertical position to a horizontal position in accordance with an exemplary embodiment of the present invention.

As seen in FIG. 5, it illustrates a schematic representation of operation of a highway grade crossing entrance gate 500 from a vertical position 505(1) to a horizontal position 505(2) in accordance with an exemplary embodiment of the present invention. When 9-30 VDC in, it gets reduced to 12 VDC if over 12 VDC. Under 9 VDC or loss of power, control switches to do dynamic braking only (counter weight & snub setting (fail safe)). Angle 90 degree is a vertical variable and a brake is ON. The X is a soft start variable. Angle 70 degrees is a current power down angle. Then Y=X−Z (Angle) which is PWM and dynamic braking. Here Z is a soft stop variable (reverse current braking). Angle 0 degree is a horizontal variable with optional brake. The gate control (GC+) is removed.

Figure 6:
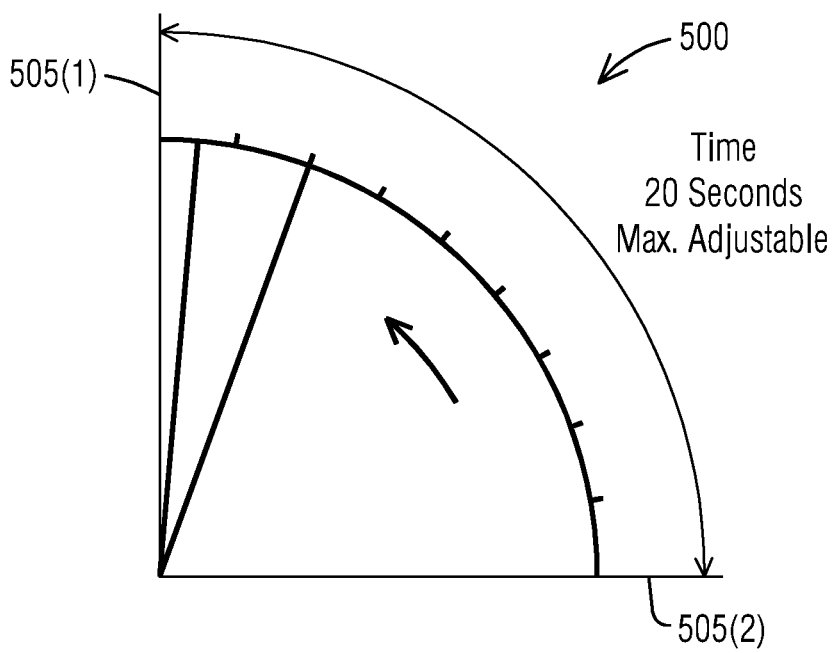
FIG. 6 illustrates a schematic representation of operation of the highway grade crossing entrance gate from the horizontal position to the vertical position in accordance with an exemplary embodiment of the present invention.

As shown in FIG. 6, it illustrates a schematic representation of operation of the highway grade crossing entrance gate 500 from the horizontal position 505(2) to the vertical position 505(1) in accordance with an exemplary embodiment of the present invention. Angle 90 degree is a vertical variable and a brake is ON. The X is a soft start variable (PWM). Then Y=X−Z (Angle) which is PWM. Here Z is a soft stop variable (PWM). Angle 0 degree is a horizontal variable with optional brake. The gate control (GC+) is applied.

By reducing voltage to name plate rating, the highway grade crossing gate mechanism (10, 302) may increase the life of electronic, mechanical and motor components and also allow a common assembly to be used in 12 and 24 VDC markets. By using something other than cams and contacts, the highway grade crossing gate mechanism (10, 302) may detect and control speed, drive outputs at various angles and report up and down cycle times.

The control PCB 312 may measure and report current draw to aid in gate setup and installation. The control PCB 312 may report a change in a current such that if an increase is detected, snow and ice could be present on the gate arm causing to send an alarm that the gate needs maintenance. The control PCB 312 may report a change in a current such that if current decreases, part of the gate arm could be missing or the counter weights have slid from the initial position.

The highway grade crossing gate mechanism (10, 302) allows expandability for future features. The highway grade crossing gate mechanism (10, 302) eliminates wear on the mechanical brake, no more maintenance or air gap checks are needed. The highway grade crossing gate mechanism (10, 302) reduces shock to the drive train with less stress on the bearings and more even torque loading on the gears. The highway grade crossing gate mechanism (10, 302) extends the life of the fiberglass gate arm itself while soft starts and soft stops lessen the flexing at the vertical position and the horizontal position when the drive train stops and the gate arm keeps moving due to inertia which equals less stress fractures of the gate arm (already subjected to UV degradation over time) and a longer life expectancy.

While a powered gate is described here a range of other constructions of a gate mechanism and a gate arm are also contemplated by the present invention. For example, other types of crossing gate mechanisms and gate arms may be implemented based on one or more features presented above without deviating from the spirit of the present invention.

The techniques described herein can be particularly useful for a highway grade crossing gate mechanism for controlling rotation of a gate arm without mechanical user adjustments but rather use user angle and time inputs/outputs. While particular embodiments are described in terms of a human machine interface (HMI), the techniques described herein are not limited to the human machine interface but can also be used with other user interface devices such as cell phones with applications (APPs).

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A highway grade crossing gate mechanism, comprising:
    a gate arm configured to rotate 90 degrees from a horizontal position to a vertical position and vice versa;
    a gear train coupled to a main shaft;
    a DC motor coupled to the gear train;
    a brake coupled to the DC motor;
    a voltage reduction circuit to receive an input voltage from a battery and reduce the input voltage;
    a human machine interface (HMI) to receive a plurality of programmable set points as operational variables for at least one of a power down indication, a power up indication, a brake application, a flashing lights turn on or turn off angle, a bell turn off or turn on angle, and angle information for a gate down position; and
    a control printed circuit board (PCB) coupled to the HMI, the voltage reduction circuit, the brake, and the DC motor, the control PCB to receive an output based on an angular position of the gate arm as a position indication to have the control PCB provide an output to the flashing lights, the bell and provide a plurality of angle outputs,
    wherein the control PCB is controlled by a gate controller coupled to the control PCB such that the highway grade crossing gate mechanism is operable without manually adjustable cams on the main shaft that move contacts to open or close at some preset angular rotation, wherein the control PCB is configured to control an upward movement cycle of the highway grade crossing gate mechanism when a voltage signal is received from the gate controller and to control a downward movement cycle of the highway grade crossing gate mechanism when the voltage signal is removed, wherein the gate arm is moved up to a vertical position during the upward movement cycle and the gate arm is moved down to a horizontal position during the downward movement cycle, and wherein during the upward and downward movement cycles the control PCB is configured to control the brake, the DC motor, and the output of the flashing lights and the bell based on the position indication and the operational variables.

2. The highway grade crossing gate mechanism of claim 1, wherein the voltage reduction circuit to receive the input voltage of 9V-30V DC from the battery and reduce the input voltage to 12V.

3. The highway grade crossing gate mechanism of claim 2, wherein with the measuring devices and a known gear train reduction ratio of the gear train a number of revolutions the DC motor make to raise the gate arm to the vertical position are determined which provides an ability to drive an output at any gate arm angle thus eliminating a need for the cams and the contacts.

4. The highway grade crossing gate mechanism of claim 1, wherein with a user adjustable input for a gate up time and a gate down time, the gate controller pulse width modulates (PWM) the DC motor to control up and down times of the gate arm as (speed=time/distance) or in a rotational gear case (speed=time/motor revolutions).

5. The highway grade crossing gate mechanism of claim 4, wherein the up and down times of the gate arm are independent of a supply voltage and a gate torque.

6. The highway grade crossing gate mechanism of claim 5, wherein based on a known number of revolutions the DC motor ought to make, a soft start of the gate arm from the vertical position is implemented, then the gate arm is driven down with an assist of gravity to a preset angle, turning OFF the DC motor and dynamically braking or applying a reverse current braking to slowly control decent of the gate arm and using a soft stop adjustable input angle to soft stop the gate arm as the gate arm nears the horizontal position.

7. The highway grade crossing gate mechanism of claim 1, wherein as the gate arm is going up, a horizontal brake feature is released, a pulse width modulation (PWM)-based soft start is used to get the gate arm moving from the horizontal position.

8. The highway grade crossing gate mechanism of claim 7, wherein pulse width modulation (PWM) is then used with a variable time input to control the gate arm or a motor speed as the gate arm approaches the vertical position.

9. The highway grade crossing gate mechanism of claim 8, wherein a PWM sequence is used to slow the movement of the DC motor or the gate arm as the gate arm reaches the vertical position and energizes the brake.

10. A method of providing a highway grade crossing gate mechanism, the method comprising:
providing a gate arm configured to rotate 90 degrees from a horizontal position to a vertical position and vice versa;
providing a gear train coupled to a main shaft;
providing a DC motor coupled to the gear train;
providing a brake coupled to the DC motor;

providing a voltage reduction circuit to receive an input voltage from a battery and reduce the input voltage;

providing a human machine interface (HMI) to receive a plurality of programmable set points as operational variables for at least one of a power down indication, a power up indication, a brake application, a flashing lights turn on or turn off angle, a bell turn off or turn on angle, and angle information for a gate down position; and providing a control printed circuit board (PCB) coupled to the HMI, the voltage reduction circuit, the brake, and the DC motor, the control PCB to receive an output based on an angular position of the gate arm as a position indication to have the control PCB provide an output to the flashing lights, the bell and provide a plurality of angle outputs, wherein the control PCB is controlled by a gate controller coupled to the control PCB such that the highway grade crossing gate mechanism is operable without manually adjustable cams on the main shaft that move contacts to open or close at some preset angular rotation, wherein the control PCB is configured to control an upward movement cycle of the highway grade crossing gate mechanism when a voltage signal is received from the gate controller and to control a downward movement cycle of the highway grade crossing gate mechanism when the voltage signal is removed, wherein the gate arm is moved up to a vertical position during the upward movement cycle and the gate arm is moved down to a horizontal position during the downward movement cycle, and wherein during the upward and downward movement cycles the control PCB is configured to control the brake, the DC motor, and the output of the flashing lights and the bell based on the position indication and the operational variables.

11. The method of claim 10, wherein the voltage reduction circuit to receive the input voltage of 9V-30V DC from the battery and reduce the input voltage to 12V.

12. The method of claim 11, wherein with the measuring devices and a known gear train reduction ratio of the gear train a number of revolutions the DC motor make to raise the gate arm to the vertical position are determined which provides an ability to drive an output at any gate arm angle thus eliminating a need for the cams and the contacts.

13. The method of claim 10, wherein with a user adjustable input for a gate up time and a gate down time, the gate controller pulse width modulates (PWM) the DC motor to control up and down times of the gate arm as (speed=time/distance) or in a rotational gear case (speed=time/motor revolutions).

14. The method of claim 13, wherein the up and down times of the gate arm are independent of a supply voltage and a gate torque.

15. The method of claim 14, wherein based on a known number of revolutions the DC motor ought to make, a soft start of the gate arm from the vertical position is implemented, then the gate arm is driven down with an assist of gravity to a preset angle, turning OFF the DC motor and dynamically braking or applying a reverse current braking to slowly control decent of the gate arm and using a soft stop adjustable input angle to soft stop the gate arm as the gate arm nears the horizontal position.

16. The method of claim 10, wherein as the gate arm is going up, a horizontal brake feature is released, a pulse width modulation (PWM)-based soft start is used to get the gate arm moving from the horizontal position.

17. The method of claim 16, wherein pulse width modulation (PWM) is then used with a variable time input to control the gate arm or a motor speed as the gate arm approaches the vertical position.

18. The method of claim 17, wherein a PWM sequence is used to slow the movement of the DC motor or the gate arm as the gate arm reaches the vertical position and energizes the brake.

* * * * *